C. F. HENIS.

Elbow for Sheet-Metal Pipes.

No. 8,885. Reissued Sept. 2, 1879.

WITNESSES.

Saml. P. Hanson

Robt. J. Hanson

INVENTOR.

Charles F. Henis per. Ed. Mengem Edebrooke

Atty.

N. PETERS, PHOTO-LITHOGRAPHER, WASHINGTON, D. C.

UNITED STATES PATENT OFFICE.

CHARLES F. HENIS, OF PHILADELPHIA, PENNSYLVANIA.

IMPROVEMENT IN ELBOWS FOR SHEET-METAL PIPES.

Specification forming part of Letters Patent No. 173,169, dated February 8, 1876; Reissue No. 8,885, dated September 2, 1879; application filed April 21, 1879.

*To all whom it may concern:*

Be it known that I, CHARLES F. HENIS, of Philadelphia, Pennsylvania, have invented an Elbow for Sheet-Metal Pipes, of which the following is a specification.

My invention consists in constructing a pipe-elbow in sections alternately solid and open, the open sections being so constructed as to clamp together the solid ones.

Figure 1:
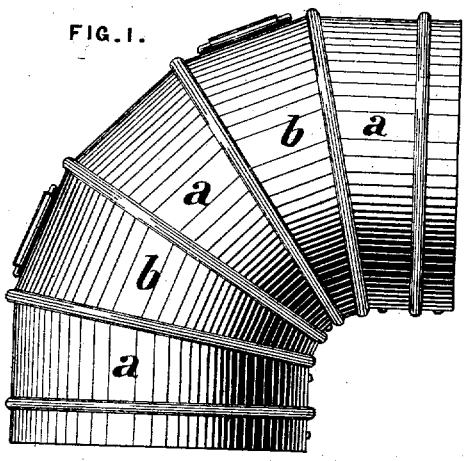
Figure 2:
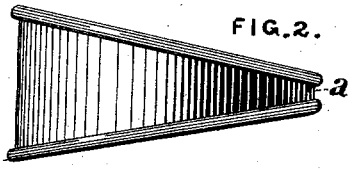
Figure 3:
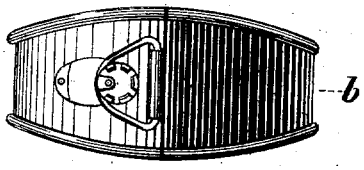
Figure 4:
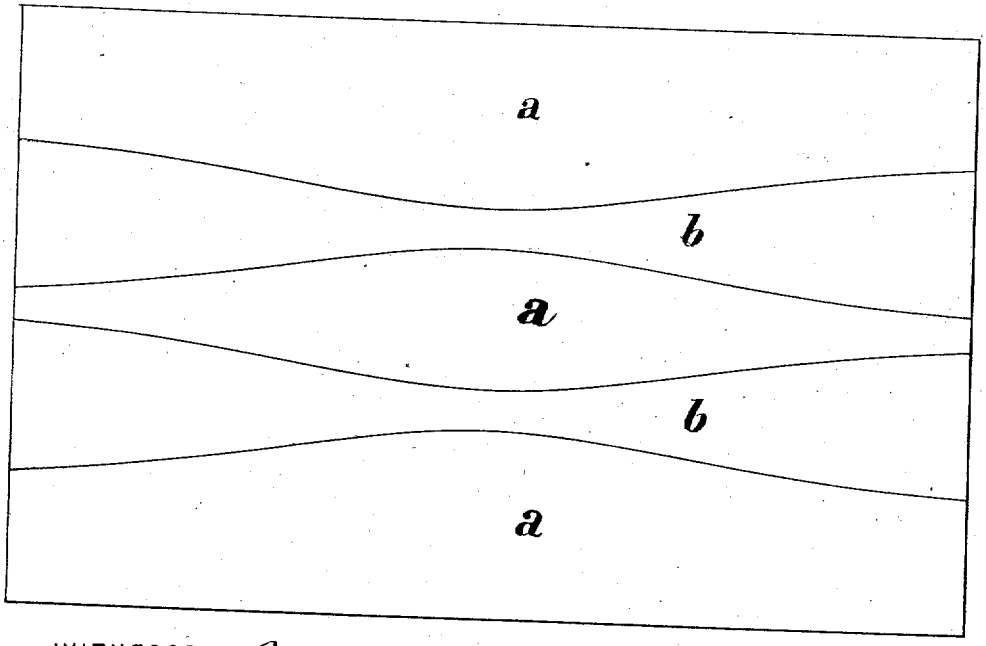

In the drawings, Figure 1 is a side elevation of the elbow. Fig. 2 is a view of a solid section. Fig. 3 is a view of an open section with an adjustable clasp. Fig. 4 is the sheet from which an elbow is cut, showing the lines of section.

The sections may be made in such numbers as may be desired.

In preparing the parts for the construction of the elbow the pieces may be cut from the sheet in the form shown in Fig. 4, alternately broad and narrow in the middle, (which can be done by one die in two cuts,) so that the whole of the sheet is used without waste, and are bent round, and a bead is formed upon the cut edges, by which process sections are formed for the construction of an elbow, of which the terminal sections *a a*, which are fastened at their ends, are in the form of a section of a cylinder, with one edge square to connect with a pipe, and with the other edge oblique to form the elbow, and the sections *b b* and also the medial section A, which is fastened at its ends, are in the form of a section of a cylinder, with both edges oblique, which sections *a a a* are called herein the "solid sections," and *b b* are called the "open sections."

In constructing the elbow, the parts are put together by passing the open sections over the solid sections and joining the ends of the open sections, the beads of the open sections fitting over the beads of the solid sections, and each open section clamping together two solid sections, and the open sections are fastened at the ends.

When the sections are put together and the open sections are loosely clasped, the parts are free to move upon each other, and by a proper adjustment of them relative to each other the elbow may be given such form as circumstances may require, and when in proper position the clasps are closed and the open sections secured tightly upon the solid ones, making an elbow perfectly firm and rigid, but which is not liable to set from rust or other adhesions, because, when the clasps are loosened, the parts can always be separated, and can again be reunited in any desired position.

No claim is made for the clasp shown, as Letters Patent No. 166,989, dated August 24, 1875, to which I refer, were granted to me for that clasp, and numerous devices can be used in its stead.

This clasp was there shown as applied to a pipe-joint—a thing which in no wise resembles the elbow herein described, and to which no part of the drawings, description, or claims of this specification in any manner relates or refers, except in so far as the terminal sections of the elbow are shown and described as having square edges to connect with pipes.

The extremities of the elbows are square, and have beads formed on them at some distance from the ends, to receive the pipe-band, as shown in Fig. 1, and are in effect pipe-sections, while the elbow-sections proper have oblique edges, upon which are formed beads, as shown in Figs. 2 and 3, fitting over and into one another, as shown in Fig. 1.

I claim as my invention—

1. A stove-pipe elbow composed of three or more sections, which are alternately broad and narrow in the middle, the outer end of each outside section being cut on a straight line on the edge, and the other edges being cut obliquely and provided with beads, one set of sections being adapted to embrace the other set, as described.

2. The combination, in a pipe-elbow, of the solid sections *a* and the open sections *b*, having beads formed upon their edges, substantially as described.

3. The sections *a b*, formed of pieces of metal cut from the sheet alternately broad and narrow in the middle without waste, and having beads formed upon their edges, for the construction of a pipe-elbow, substantially as herein described.

4. The combination of the solid sections *a* and the open sections *b*, provided with clasps or their equivalent, constructed and operating substantially as herein described.

CHAS. F. HENIS.

Witnesses:
G. MORGAN ELDRIDGE,
SAML. P. HANSON.